(12) United States Patent
Song et al.

(10) Patent No.: US 8,002,421 B2
(45) Date of Patent: Aug. 23, 2011

(54) LIGHT GENERATING DEVICE, BACKLIGHT ASSEMBLY HAVING THE SAME, AND DISPLAY APPARATUS HAVING THE BACKLIGHT ASSEMBLY

(75) Inventors: Chun-Ho Song, Seoul (KR); Sang-Yu Lee, Yongin-si (KR); Gi-Cherl Kim, Yongin-si (KR); Seoek-Hwan Kang, Suwon-si (KR); Sang-Gil Lee, Seoul (KR); Ju-Young Yoon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 3 days.

(21) Appl. No.: 12/503,620

(22) Filed: Jul. 15, 2009

(65) Prior Publication Data

US 2009/0273920 A1 Nov. 5, 2009

Related U.S. Application Data

(63) Continuation of application No. 11/228,786, filed on Sep. 16, 2005, now Pat. No. 7,566,160.

(30) Foreign Application Priority Data

Sep. 23, 2004 (KR) .................... 10-2004-0076682

(51) Int. Cl.
*G09F 13/04* (2006.01)
(52) U.S. Cl. ....... 362/97.1; 362/612; 362/613; 362/225; 362/97.3

(58) Field of Classification Search .................. 362/601, 362/612, 613, 630, 634, 555, 559; 349/58, 349/60, 65, 67, 70
See application file for complete search history.

(56) References Cited

U.S. PATENT DOCUMENTS

| | | | |
|---|---|---|---|
| 4,491,863 A | 1/1985 | Kurahashi | |
| 4,920,409 A * | 4/1990 | Yamagishi | .................... 348/791 |
| 6,330,111 B1 | 12/2001 | Myers | |
| 6,923,548 B2 | 8/2005 | Lim | |
| 6,948,842 B2 | 9/2005 | Chang | |
| 6,964,489 B2 | 11/2005 | Blume et al. | |
| 6,969,189 B2 | 11/2005 | Lee et al. | |
| 7,588,362 B2 * | 9/2009 | Park et al. | ...................... 362/612 |
| 7,637,626 B2 * | 12/2009 | Park et al. | ..................... 362/97.3 |

(Continued)

FOREIGN PATENT DOCUMENTS

DE 29707964.6 U1 8/1997

(Continued)

*Primary Examiner* — Ali Alavi
(74) *Attorney, Agent, or Firm* — Innovation Counsel LLP

(57) ABSTRACT

A light-generating device includes a driving substrate and a plurality of light source arrays. The driving substrate has a rectangular planar shape. The plurality of light source arrays is formed on the driving substrate. The light source arrays include at least one light emitting diode to generate light in response to power being applied through the substrate, and the light source arrays are spaced apart from each other. Thus, heat generated from the light-generating device is rapidly dissipated from the light-generating device, improving brightness of the light, brightness uniformity of the light and color reproducibility of the light.

20 Claims, 9 Drawing Sheets

U.S. PATENT DOCUMENTS

| | | |
|---|---|---|
| 2002/0001192 A1 | 1/2002 | Suehiro et al. |
| 2003/0063062 A1 | 4/2003 | Tsumura et al. |
| 2004/0130884 A1 | 7/2004 | Yoo et al. |
| 2004/0218388 A1 | 11/2004 | Suzuki |
| 2004/0223328 A1 | 11/2004 | Lee et al. |
| 2004/0264212 A1 | 12/2004 | Chung et al. |
| 2005/0002205 A1 | 1/2005 | Yu et al. |
| 2005/0169007 A1* | 8/2005 | Chou .................. 362/555 |
| 2005/0265029 A1 | 12/2005 | Epstein et al. |
| 2006/0033423 A1 | 2/2006 | Nishimura |
| 2006/0087866 A1* | 4/2006 | Ng et al. ................ 362/612 |

FOREIGN PATENT DOCUMENTS

| | | |
|---|---|---|
| FR | 2789768 A1 | 2/2000 |
| JP | 2001-195904 | 7/2001 |
| JP | 2001-210122 A | 8/2001 |
| JP | 2003-107472 | 4/2003 |
| JP | 2004-191490 | 7/2004 |

* cited by examiner

LIGHT GENERATING DEVICE, BACKLIGHT ASSEMBLY HAVING THE SAME, AND DISPLAY APPARATUS HAVING THE BACKLIGHT ASSEMBLY

CROSS REFERENCE TO RELATED APPLICATIONS

This is a continuation application of U.S. patent application Ser. No. 11/228,786, filed on Sep. 16, 2005, which claims priority under 35 USC §119 to Korean Patent Application No. 2004-76682 filed on Sep. 23, 2004, the contents of which are incorporated herein by reference in their entirety.

BACKGROUND OF THE INVENTION

1. Field of the Invention

The present invention relates to a light-generating device, a backlight assembly having the light generating device, and a display apparatus having the backlight assembly. More particularly, the present invention relates to a light generating device capable of enhancing brightness, brightness uniformity and color reproducibility, a backlight assembly having the light generating device, and a display apparatus having the backlight assembly.

2. Description of the Related Art

Generally, an information processing apparatus processes data in the form of electrical signals. A display apparatus converts the data that is processed by the information processing apparatus into an image. The display apparatus may be a cathode ray tube (CRT) display apparatus, a liquid crystal display (LCD) apparatus, a plasma display panel (PDP) apparatus, an organic light emitting display (OLED) apparatus, etc.

Of the different types of display apparatuses, the LCD apparatus displays images by using electrical and optical characteristics of liquid crystal molecules.

The LCD apparatus often requires a light source in order to display the image. The light source may be a light emitting diode (LED), a cold cathode fluorescent lamp (CCFL), a flat fluorescent lamp (FFL), etc.

Most of the conventional LCD apparatuses typically include the CCFL. However, recently, LED and FFL are coming to be widely used as the light source for LCD apparatuses. Although LED has its advantages over the conventional CCFL light source, it also has disadvantages in that a display apparatus employing an LED light source typically has a light with low brightness uniformity, low brightness, and low color reproducibility compared to a display apparatus employing the CCFL.

A method is desired for enhancing the brightness uniformity, brightness, and color reproducibility of display apparatuses employing LED as light sources.

SUMMARY OF THE INVENTION

It is one feature of the present invention to provide a light-generating device capable of improving brightness, brightness uniformity, and color reproducibility of a display apparatus.

It is another feature of the present invention to provide a backlight assembly including the above-mentioned light-generating device.

It is still another feature of the present invention to provide a display apparatus including the above-mentioned backlight assembly.

The light-generating device in accordance with an exemplary embodiment of the present invention includes a driving substrate and a plurality of light source arrays. The light source arrays are formed on the driving substrate. Each of the light source arrays includes a plurality of light emitting diodes that generate light when electric power is applied thereto through the driving substrate. The light source arrays are spaced apart from each other.

The backlight assembly in accordance with an exemplary embodiment of the present invention includes a light generating device and a receiving container. The light generating device includes a driving substrate and a plurality of light source arrays formed on the driving substrate. Each of the light source arrays includes a plurality of light emitting diodes that generate light when electric power is applied thereto through the substrate. The light source arrays are spaced apart from each other. The receiving container has a bottom plate and sidewalls that are formed at edge portions of the bottom plate. The driving substrate is disposed on the bottom plate.

The display apparatus in accordance with an exemplary embodiment of the present invention includes a backlight assembly and a display panel. The light generating device generates light. The light generating device includes a plurality of driving substrate. Each of the driving substrates includes a plurality of light source arrays formed thereon. Each of the light source arrays includes a plurality of light emitting diodes that generate light when electric power is applied thereto through the substrate. The light source arrays are spaced apart from each other. The receiving container has a bottom plate, and sidewalls are formed at edge portions of the bottom plate. The driving substrate is disposed on the bottom plate. The display panel displays an image by using the light generated by the light generating device.

Since the light source arrays are arranged in a staggered configuration on the bottom plate of the receiving container, the heat generated from the light emitting diodes is rapidly dissipated from the light generating device. Thus, the brightness and color reproducibility of the light that is generated from each of the light emitting diodes are improved.

BRIEF DESCRIPTION OF THE DRAWINGS

The above and other features and advantages of the present invention will become readily apparent by reference to the following detailed description when considered in conjunction with the accompanying drawings.

DESCRIPTION OF THE EMBODIMENTS

The present invention now will be described more fully hereinafter with reference to the accompanying drawings, in which embodiments of the invention are shown. The present invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
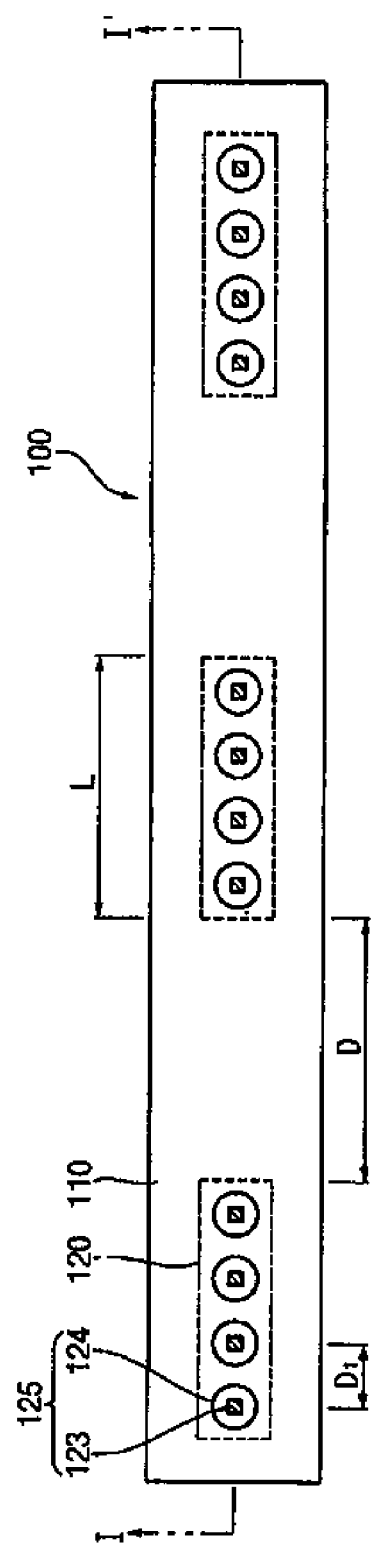
FIG. 1 is a schematic plan view illustrating a light-generating device in accordance with an exemplary embodiment of the present invention.
Figure 2:
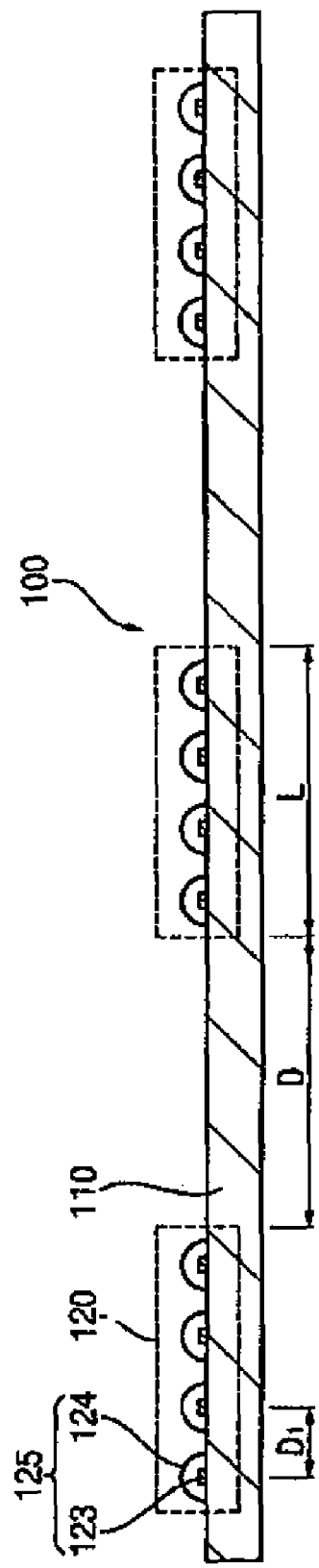
FIG. 2 is a cross-sectional view taken along a line I-I' in FIG. 1.

In the drawings, the thickness of layers and regions are exaggerated for clarity. Like reference numerals refer to similar or identical elements throughout. It will be understood that when an element such as a layer, region or substrate is referred to as being "on" another element, it can be directly on the other element or intervening elements may also be present.
Light Generating Device FIG. 1 is a schematic plan view illustrating a light-generating device in accordance with an exemplary embodiment of the present invention. FIG. 2 is a cross-sectional view taken along a line I-I' in FIG. 1.

Referring to FIGS. 1 and 2, a light-generating device 100 includes a driving substrate 110 and a light source array 120. The driving substrate provides power to the light source array. A "light source array," as used herein, includes one or more light emitting diodes.

The driving substrate 110 has a rectangular shape having two long sides and two short sides. A printed circuit board (PCB) or a metal-coated printed circuit board (MC-PCB) having a relatively high heat conductive material coated thereon may be employed as the driving substrate 110, among other possibilities. In some embodiments, the driving substrate 110 includes a power-supply line (not shown) for transferring the power provided from an external power-supplying unit to the driving substrate 110.

At least one light source array 120 is disposed on the driving substrate 110. In some embodiments, a plurality of the light source arrays 120 are arranged parallel to the long side of the driving substrate 110. For example, the light source arrays 120 are disposed on the driving substrate 110 in a straight line. Each of the light source arrays 120 has a length L on the driving substrate 110, and the neighboring light source arrays 120 are spaced apart by an interval D. The interval D between the light source arrays 120 that neighbor each other along the long side of the driving substrate 110 may be substantially the same as the length L, although this is not a limitation of the invention.

Each of the light source arrays 120 includes at least one light emitting diode 125. Two light emitting diodes 125 that are positioned next to one another are spaced apart by an interval $D_1$ that is shorter than the interval D between the light source arrays 120. The light emitting diodes 125 in the light source arrays 120 are arranged in a line that extends along a direction parallel to the long side of the driving substrate 110. The number of the light emitting diodes 125 may be about 2 to about 4. Each of the light emitting diodes 125 emits light when electric power is applied to the light emitting diodes 125 through the power-supply line.

Each of the light emitting diodes 125 in the light source arrays 120 has a light emitting diode (LED) 123 and a micro-lens 124.

The LED 123 emits light in a predetermined wavelength range. More specifically, each LED 123 is a red LED for generating red light, a green LED for generating green light, or a blue LED for generating blue light. Light emitting diodes 125 emitting red, green, and blue light are disposed on the driving substrate 110 in an alternating manner such that the red, green and blue lights generated by the light emitting diodes 123 are mixed to generate white light. Thus, the driving substrate 110 supplies power for generating white light.

The micro-lens 124 of the light emitting diode 125, which may have a dome shape, adjusts the direction of the light that is generated from the LED 123.

As described above, the light source arrays 120 having the light emitting diodes 125 are spaced apart from each other by the interval D on the driving substrate 110. This way, the heat generated from the light generating device 100 is rapidly dissipated from the light generating device 100. By preventing the light generating device 100 from heating up, the light source arrays of the above configuration improve the brightness, brightness uniformity, and color reproducibility of the light.

Figure 3:
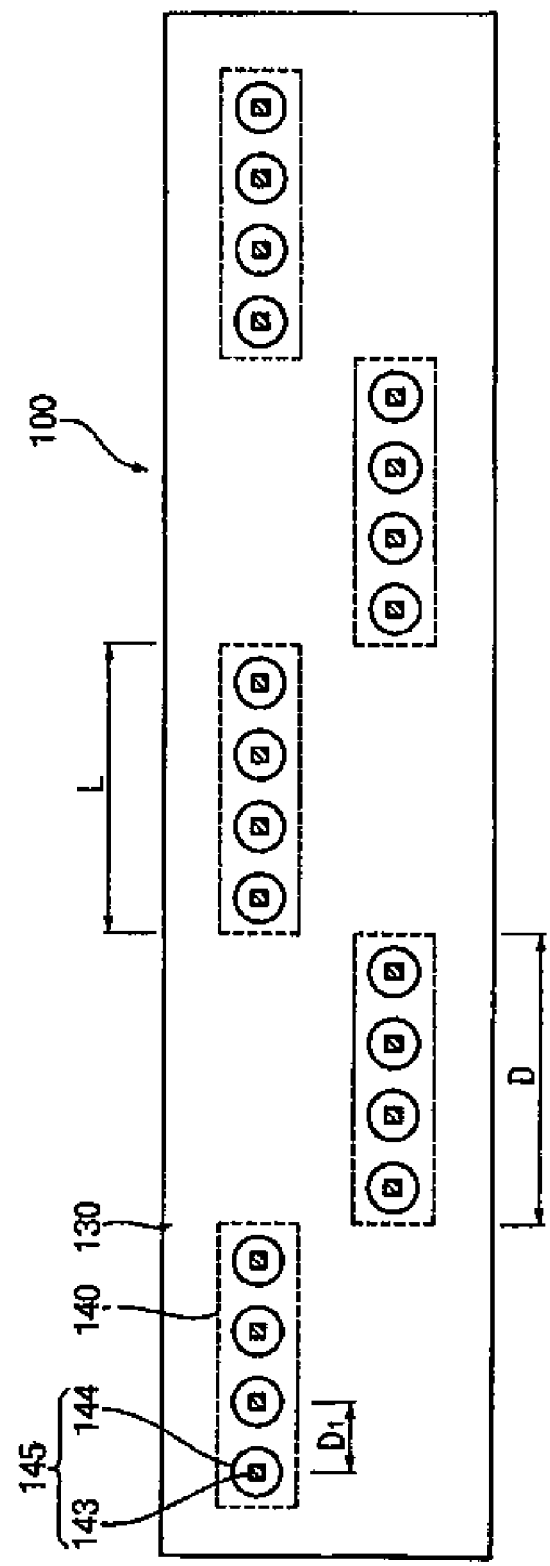
FIG. 3 is a schematic plan view illustrating a light-generating device in accordance with another exemplary embodiment of the present invention.

FIG. 3 is a schematic plan view illustrating a light-generating device in accordance with another embodiment of the present invention.

Referring to FIG. 3, a light-generating device 100 includes a driving substrate 130 and a plurality of light source arrays 140.

The driving substrate 130 has a rectangular planar shape with two first sides and two second sides. The first sides have a first length, and the second sides have a second length that is shorter than the first length of the first sides.

A printed circuit board (PCB) or a metal-coated printed circuit board (MC-PCB) having a relatively high heat conductive material on the PCB may be employed as the driving substrate 130. In some embodiments, the driving substrate 130 includes a power-supply line (not shown) for transferring electric power provided from an external power-supplying unit to the driving substrate 130.

The light source arrays 140 are disposed on the driving substrate 130. For example, the light source arrays 140 are arranged along a direction parallel to the first side of the driving substrate 130.

Each of the light source arrays 140 has a length L on the driving substrate 110, and the neighboring light source arrays 140 are spaced apart by an interval D in the direction parallel to the first side. The interval D between the light source arrays 120 is substantially the same as the length L.

In this embodiment, the light source arrays 140 are arranged along a first line and a second line that are substantially parallel to each other. Each of the light source arrays 140 arranged along the first line is aligned with the interval D between the light source arrays 140 arranged along a second line. Thus, the light source arrays 140 disposed along the two lines on the driving substrate 130 are arranged in a staggered configuration in plan view.

Each of the light source arrays 140 arranged in the staggered configuration includes at least one light emitting diode 145. The two neighboring light emitting diodes 145 are separated by an interval $D_1$ that is shorter than the interval D between the light source arrays 140.

The light emitting diodes 145 in the light source arrays 140 are arranged along a direction parallel to the first side of the driving substrate 130 in a line. The number of the light emitting diodes 145 in each of the light source arrays 140 is about 2 to about 4.

Each of the light emitting diodes 145 emits light when electric power is supplied to the light emitting diodes 145 through the power-supply line.

Each of the light emitting diodes 145 in the light source arrays 140 has a light emitting diode (LED) 143 and a micro-lens 144.

The LED 143 emits light in a predetermined wavelength range. More specifically, each LED 143 is a red LED for generating red light, a green LED for generating green light, or a blue LED for generating blue light. The light emitting diodes 145 emitting red, green, and blue light are disposed on the driving substrate 130 in an alternating manner such that the red, green, and blue lights generated by each of the light emitting diodes 145 are mixed to generate white light. The different-colored lights mix above the driving substrate 130.

The micro-lens 144 of the light emitting diode 145, which may have a dome shape, adjusts the direction of the light that is generated from the LED 143.

As described above, the light source arrays 140 having the light emitting diodes 145 are spaced apart from each other at the interval D on the driving substrate 130. This way, the heat generated from the light generating device 100 is rapidly dissipated from the light generating device 100. By preventing the light generating device 100 from heating up, the light source arrays of the above configuration improve the brightness, brightness uniformity, and color reproducibility of the light.

Figure 4:
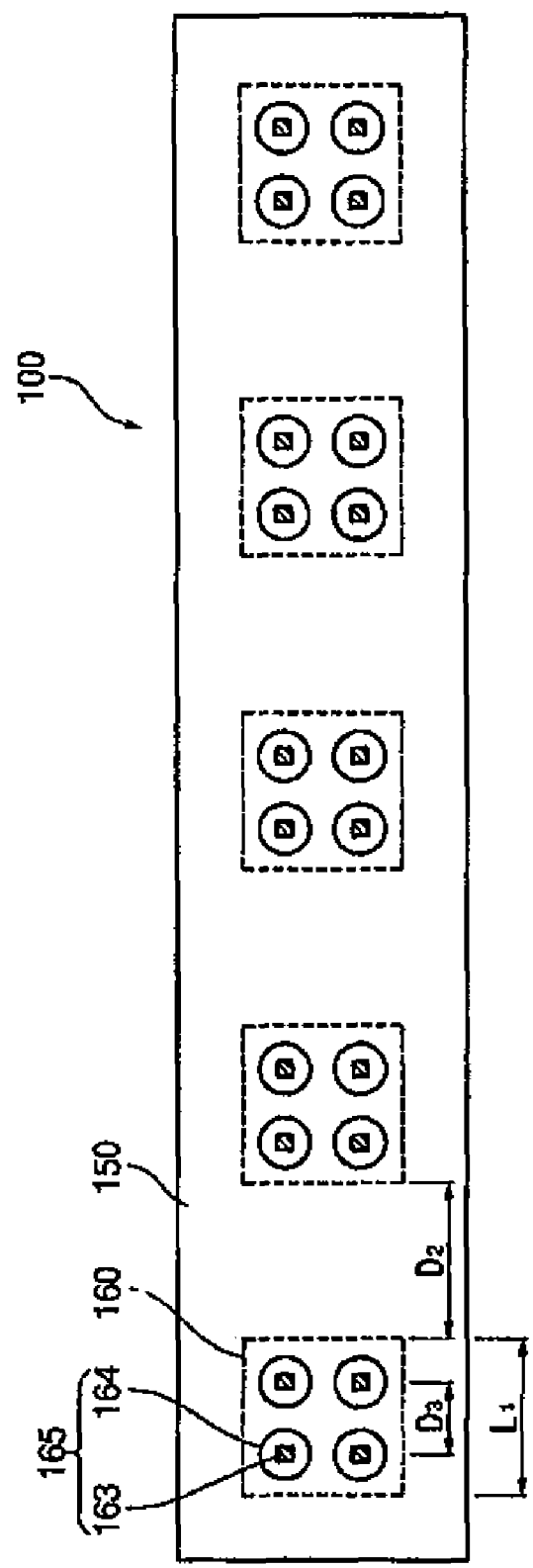
FIG. 4 is a plan view illustrating a light-generating device in accordance with still another exemplary embodiment of the present invention.

FIG. 4 is a plan view illustrating a light-generating device in accordance with yet another embodiment of the present invention.

Referring to FIG. 4, a light-generating device includes a driving substrate 150 and a light source array 160.

The driving substrate 150 has a rectangular planar shape and the driving substrate 150 has two first sides and two second sides. A printed circuit board (PCB) or a metal-coated printed circuit board (MC-PCB) having a relatively high heat conductive material coated thereon may be employed as the driving substrate 150, among other possibilities. The driving substrate 150 includes a power-supply line for transferring a power from an external power-supplying unit to the driving substrate 150.

The light source arrays 160 are disposed on the driving substrate 150. The light source arrays 160 are serially disposed along a direction parallel to the first side of the driving substrate in a line. In this embodiment, for example, about five light source arrays 160 are formed on the driving substrate 150. Each of the light source arrays 160 has a length $L_1$, and two neighboring light source arrays 160 are spaced apart from each other by an interval $D_2$. In some embodiments, the interval $D_2$ is substantially the same as the length $L_1$.

Each of the light source arrays 160 includes at least one light emitting diode 165. the two neighboring light emitting diodes 165 are spaced apart from each other by an interval $D_3$, and the interval $D_3$ is substantially smaller than that of the interval $D_2$.

The light emitting diodes 165 in the light source arrays 160 are arranged in a matrix. For example, the light emitting diodes 165 may be arranged in a square matrix such as a 2×2 matrix or a 3×3 matrix. The light emitting diodes 165 generate light by the power provided from the driving substrate 150.

Each of the light emitting diodes 165 in the light source arrays 160 has a light emitting diode (LED) 163 and a micro-lens 164.

The LED 163 emits light in a predetermined wavelength range. More specifically, each LED 163 is a red LED for generating red light, a green LED for generating green light, or a blue LED for generating blue light. The light emitting diodes 165 emitting red, green, and blue light are disposed on the driving substrate 150, so as to generate red light, green light, and blue light. The red light, the green light in an alternating manner such that the different-colored lights are mixed to generate white light. The different-colored lights are mixed over the driving substrate 150 of the light generating device 100.

The micro-lens 164 of the light emitting diode 165, which may have a dome shape, adjusts the direction of the light that is generated from the LED 163.

As described above, the light source arrays 160 having the light emitting diode 165 are spaced apart from each other at the interval $D_2$ on the driving substrate 150. This way, the heat generated from the light generating device 100 is rapidly dissipated from the light generating device 100, thereby improving the brightness, brightness uniformity, and color reproducibility of the light.

Backlight Assembly

Figure 5:
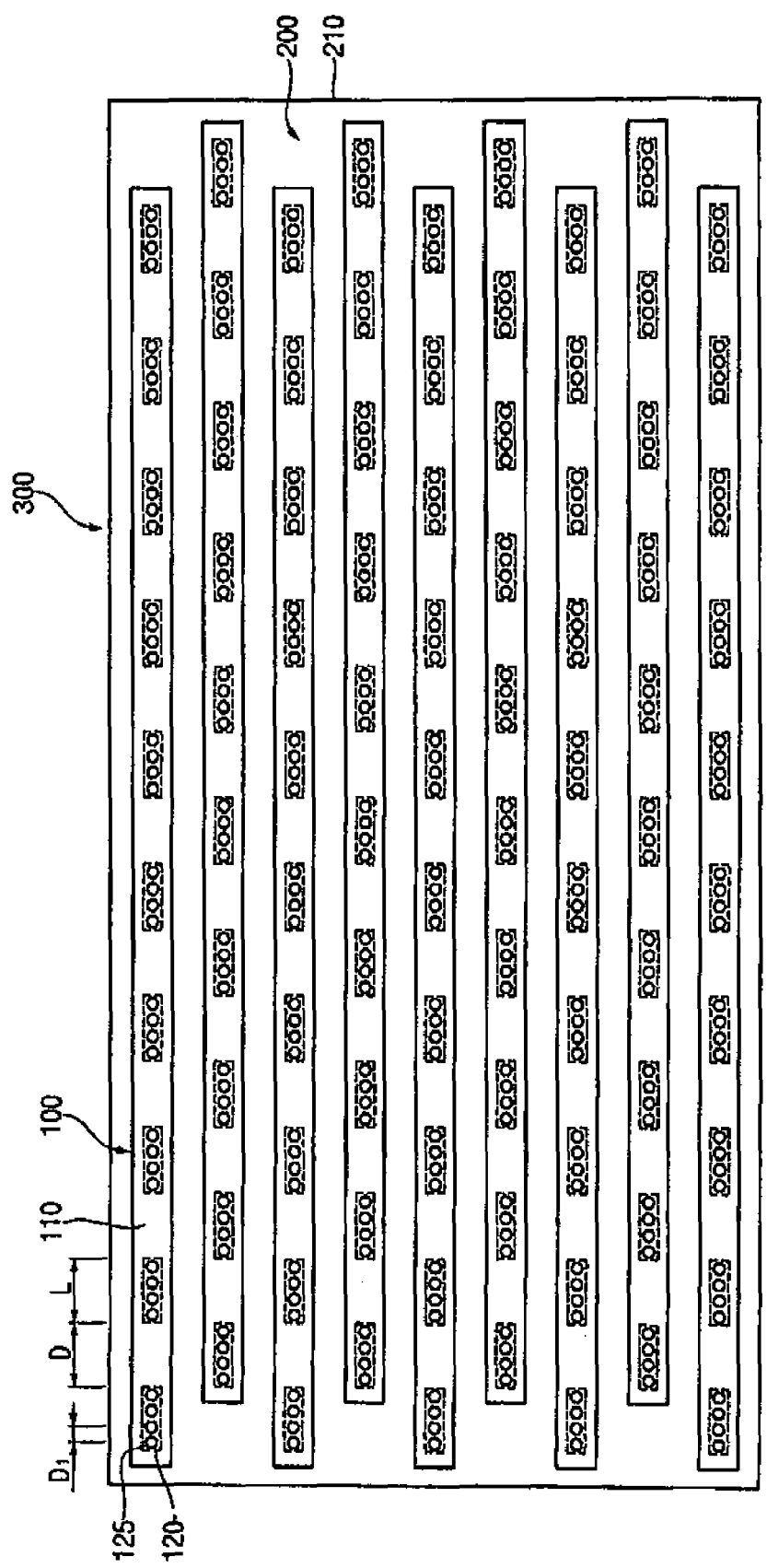
FIG. 5 is a plan view illustrating a backlight assembly in accordance with an exemplary embodiment of the present invention.

FIG. 5 is a plan view illustrating a backlight assembly in accordance with one embodiment of the present invention.

Referring to FIG. 5, a backlight assembly 300 includes a light generating device 100 and a receiving container 200.

The light-generating device 100 includes a driving substrate 110 and a plurality of light source arrays 120, as described above in reference to FIG. 1.

The driving substrate 110 has a rectangular planar shape with two first sides and two second sides. The driving substrate 110, for example, may include a printed circuit board (PCB) or metal-coated printed circuit board (MC-PCB) having a relatively high heat conductive material on the PCB. In some embodiments, the driving substrate 110 includes a power-supply line (not shown) for transferring the power provided from an external power-supplying unit to the driving substrate 110.

The light source array 120 is disposed on the driving substrate 110. The light source arrays 120 are arranged along a direction parallel to the first side of the driving substrate 110. In this embodiment, the light source arrays 120 are disposed in a line on the driving substrate 110. Each of the light source arrays 120 are formed on the driving substrate 110, and the light source arrays 120 are spaced apart from each other by an interval D in the direction in which the first side extends. The interval D between the light source arrays 120 is substantially the same as the length L.

Each of the light source arrays 120 includes a plurality of light emitting diodes 125. The light emitting diodes 125 of the light source arrays 120 are spaced apart by an interval $D_1$ that is shorter than the interval D of the light source arrays 120. The light source arrays 120 including light emitting diodes 125 are arranged in a line along a direction parallel to the first side of the driving substrate 110.

The number of the light emitting diodes 125 of the light source arrays 120 is about 2 to about 4. The light emitting diode 125 emits light when electrical power is supplied to the light emitting diodes 125 through the driving substrate 110.

Each of the light emitting diodes 125 emits red light, green light or blue light and the different-colored light emitting diodes 125 are arranged in an alternating manner to form the light source array 120. The red, green and blue lights generated by the light emitting diodes 125 are mixed over the driving substrate 110 of the light generating device 100, thereby generating white light.

The light source arrays 120 are spaced apart from each other by a regular interval D on the driving substrate 110, so that the heat generated from the light generating device 100 is rapidly dissipated from the light generating device 100. By preventing the light generating device 100 from heating up, the backlight assembly 300 improves the brightness and color reproducibility of the light generated from the light emitting diode 125.

The light source arrays are disposed in a line on the driving substrate, and the driving substrates are arranged such that and each of the light source arrays formed on a first driving substrate is disposed between the light source arrays disposed on a second driving substrate, wherein the second driving substrate neighbors the first driving substrate. Thus, the light source arrays formed at the first and second driving substrates are arranged in a staggered configuration.

A receiving container 200 includes a bottom plate 210, and the light-generating device 100 is disposed on the bottom plate 210. In the embodiment shown, the light generating devices 100 are aligned substantially parallel to each other on the bottom plate 210. Each of the light source arrays 120 of the light-generating device 100 is alternately disposed on the bottom plate 210 such that light source arrays 120 in every other light generating device 100 are aligned with one another.

Since the light source arrays 120 are disposed on the bottom plate 210 in a staggered configuration, there are sufficient spaces between heat sources. Thus, the heat generated from the light emitting diode 120 is rapidly dissipated to prevent the light-generating device 100 from heating up.

As described above, the light generating device 100 disposed on the bottom plate 210 of the receiving container 200 and the light source arrays 120 are aligned substantially parallel to each other on the bottom plate 210, and the light source arrays 120 are disposed on the bottom plate 210 in a staggered configuration.

Figure 6:
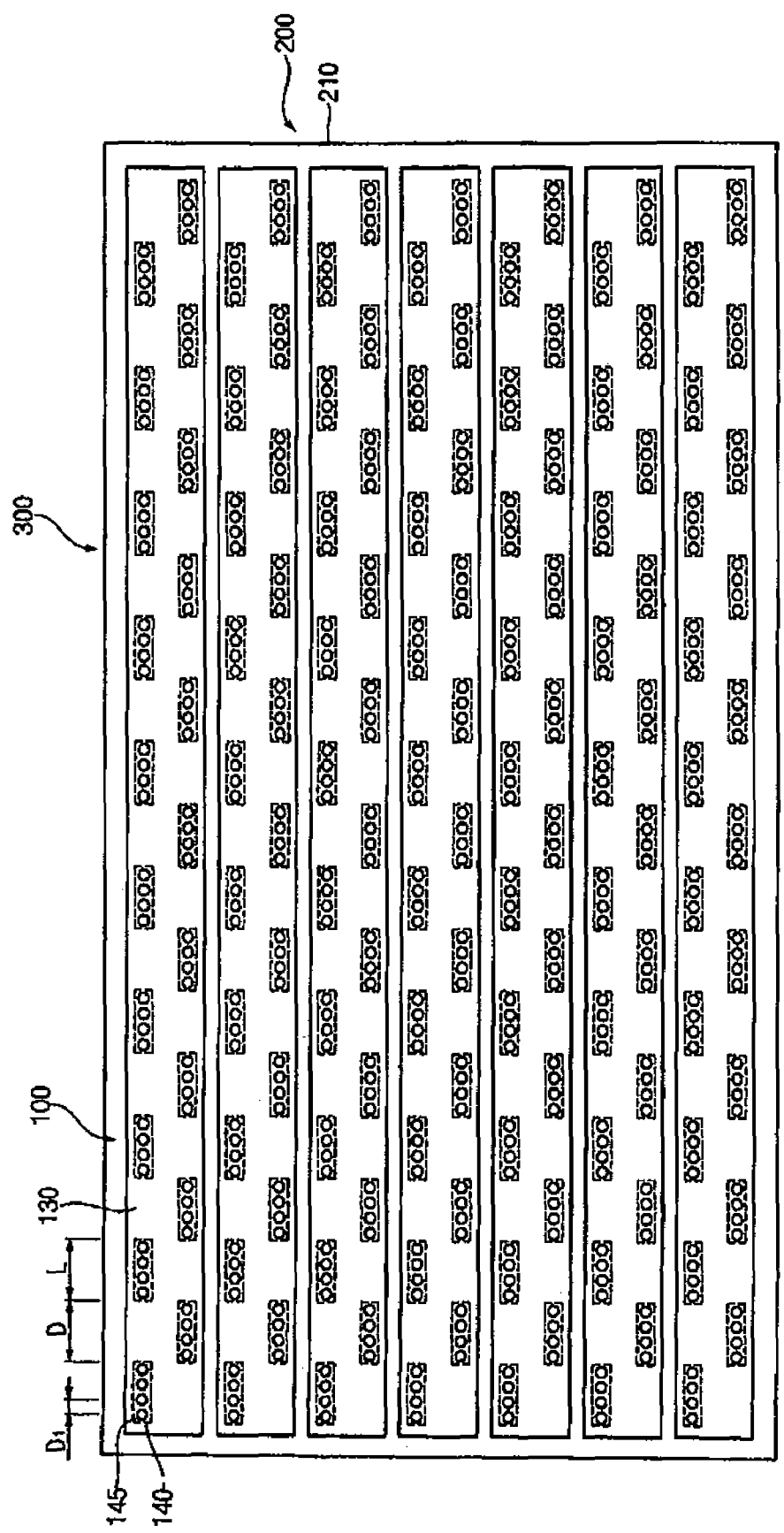
FIG. 6 is a plan view illustrating a backlight assembly in accordance with another exemplary embodiment of the present invention.

FIG. 6 is a plan view illustrating a backlight assembly in accordance with another embodiment of the present invention.

Referring to FIG. 6, a backlight assembly 300 includes a light generating device 100 and a receiving container 200.

The light-generating device 100 includes a driving substrate 130 and a light source array 140.

The driving substrate 130 has a rectangular planar shape having two first sides and two second sides. The first sides have a first length, and the second sides have a second length that is shorter than the first length of the first sides.

The driving substrate 130, for example, may include a printed circuit board (PCB) or metal-coated printed circuit board (MC-PCB) having a relatively high heat conductive material on the PCB. In some embodiments, the driving substrate 130 includes a power-supply line (not shown) for transferring the power provided from an external power-supplying unit to the driving substrate 130.

The light source array 140 is disposed on the driving substrate 130. The light source arrays 140 are arranged along a direction parallel to the first side of the driving substrate 130.

Each of the light source arrays 140 has a length L on the driving substrate 130, and the light source arrays 140 have an interval D corresponding to the length L. The interval D between the light source arrays 120 is substantially identical to the length L.

In this embodiment, the light source arrays 140 on each driving substrate 130 are arranged along a first line and a second line. Each of the light source arrays 140 arranged along the first line is disposed between the light source arrays 140 arranged along the second line. Thus, the light source arrays 140 disposed on the driving substrate 130 are arranged in a staggered configuration.

Each of the light source arrays 140 arranged in the staggered configuration includes at least one light emitting diode 145.

A pair of the light emitting diodes 145 adjacent to one another has an interval $D_1$ that is narrower than the interval D of the light source arrays 140.

The light source arrays 140 including light emitting diodes 145 are arranged along a direction parallel to the first side of the driving substrate 130 in a line. The number of the light emitting diodes 145 in each of the light source arrays 140 is about 2 to about 4. The light emitting diodes 145 emit light when electrical power is supplied to the light emitting diodes 145 through the driving substrate 130.

The light emitting diode 145 is a red LED for generating red light, a green LED for generating green light, or a blue LED for generating blue light. Light emitting diodes 145 emitting red, green, and blue lights are alternately disposed on the driving substrate 130, so that the different-colored lights are mixed over the driving substrate 130 to generate white light. The different-colored lights are mixed above the driving substrate 130.

As described above, when the light source arrays 140 having the light emitting diodes 145 are spaced apart from each other by the interval D on the driving substrate 130, the brightness, brightness uniformity, and color reproducibility of the light are greatly improved.

A receiving container 200 may include a bottom plate 210, and the light-generating device 100 is disposed on the bottom plate 210. In this embodiment, the light generating devices 100 are aligned substantially parallel to each other on the bottom plate 210. The light source arrays 140 of the light-generating device 100 are disposed on the bottom plate 210 in a staggered configuration.

Figure 7:
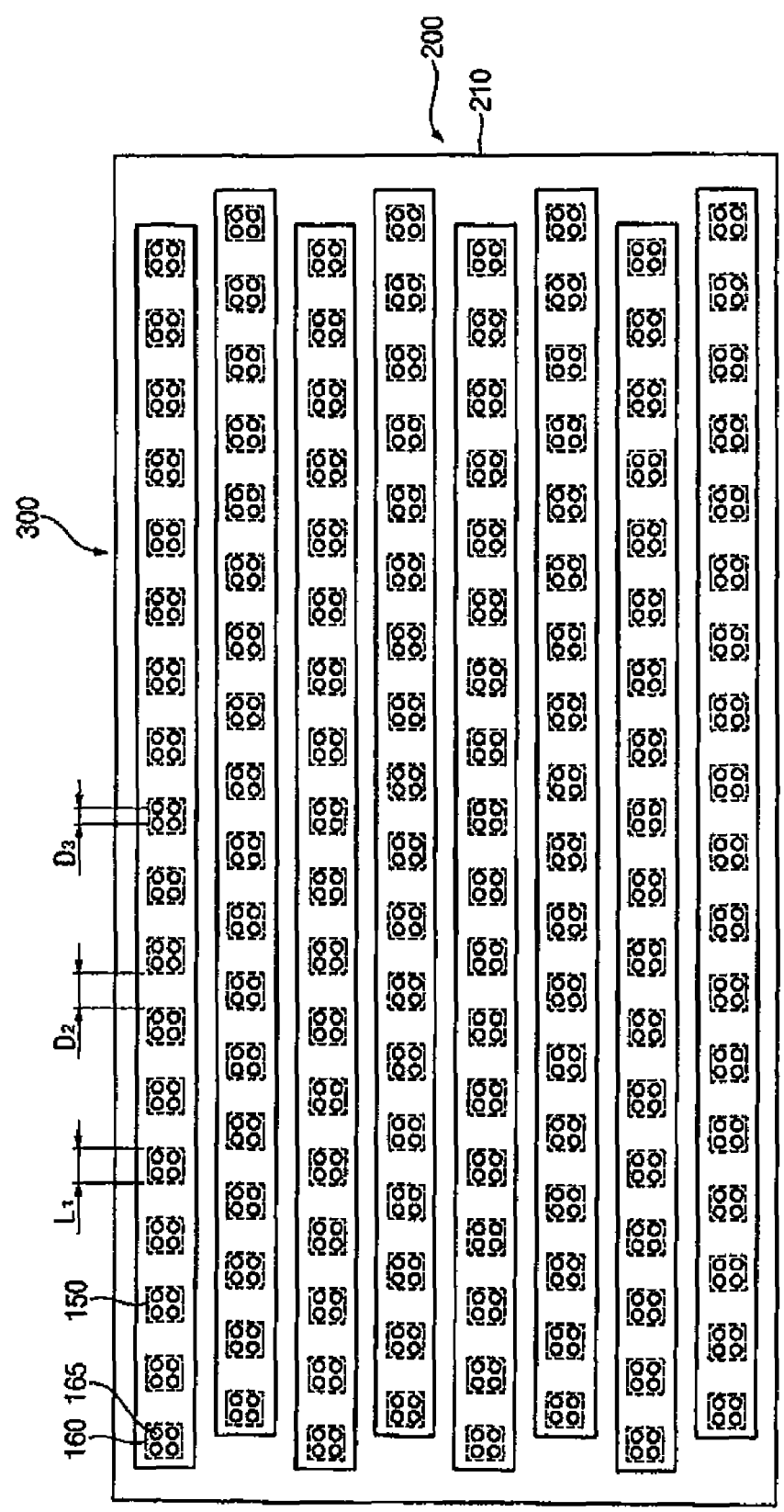
FIG. 7 is a plan view illustrating a backlight assembly in accordance with still another exemplary embodiment of the present invention.

FIG. 7 is a plan view illustrating a backlight assembly in accordance with still another embodiment of the present invention.

Referring to FIG. 7, a backlight assembly 300 includes a light generating device 100 and a receiving container 200.

The light-generating device 100 has a driving substrate 150 and a light source array 160.

The driving substrate 150 has a rectangular plate shape having a first side and a second side. The driving substrate 150, for example, may include a printed circuit board (PCB) or metal-coated printed circuit board (MC-PCB) having a high heat conductive material on the PCB. In some other embodiments, the driving substrate 150 includes a power-supply line (not shown) for transferring the power provided from an external power-supplying unit to the driving substrate 150.

The light source array 160 is disposed on the driving substrate 150. The light source arrays 160 are arranged along a direction parallel to the first side of the driving substrate 150. In this embodiment, the light source arrays 160 are disposed on the driving substrate 150 along a line. Each of the light source arrays 160 has a length $L_1$ on the driving substrate 150, and the light source arrays 160 are spaced apart by an interval $D_2$. The interval $D_2$ between the light source arrays 160 is substantially the same as the length $L_1$.

Each of the light source arrays 160 includes light emitting diodes 165. The light emitting diodes 165 of the light source arrays 160 are spaced apart by an interval $D_3$ that is shorter than the interval $D_2$ between the light source arrays 160.

The light emitting diodes 165 included in each of the light source arrays 160 are disposed on the light source array 160 in a matrix configuration. The light emitting diodes 165 included in each of the light source arrays 160 are disposed on the light source arrays 160 in a square matrix such as a 2×2 matrix or a 3×3 matrix The light emitting diodes 165 generate light upon receiving the power supplied from the driving substrate 150.

Each of the light emitting diodes 165 is a red light emitting diode that generates red light, a green light emitting diode that generates green light, or a blue light emitting diode that generates blue light.

In this embodiment, the light emitting diodes 165 that generate the red, green and blue lights are arranged in an alternating manner to form the light source array 160. The red, green, and blue lights generated by each of the light emitting diodes 165 are mixed over the driving substrate 150 to generate white light.

A receiving container 200 may include a bottom plate 210, and the light generating devices 100 are disposed on the bottom plate 210. In this embodiment, the light generating devices 100 are aligned substantially parallel to each other on the bottom plate 210. Each of the light source arrays 160 of the light-generating device 100 is alternately disposed on the bottom plate 210.

In detail, the light emitting diodes 165 in each of the light source arrays 160 formed at each of driving substrate 150 are arranged on the driving substrate 150 in a matrix, and the driving substrates are disposed such that each of the light source arrays 160 formed on a first driving substrate is disposed between the light source arrays 160 that are formed on a second driving substrate, wherein the second driving substrate is adjacent to the first driving substrate.

Figure 8:
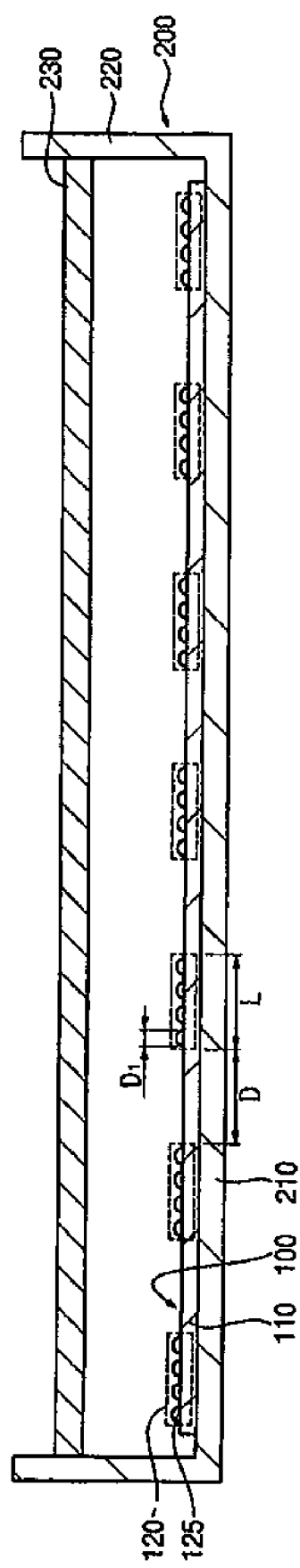
FIG. 8 is a cross sectional view illustrating a backlight assembly in accordance with still another exemplary embodiment of the present invention.

FIG. 8 is a cross sectional view illustrating a backlight assembly in accordance with still another embodiment of the present invention. The backlight assembly as shown in FIG. 8 is the same as the backlight assembly that is shown in FIG. 5 except that the backlight assembly in FIG. 8 further includes a light-mixing member. Thus, the same reference numerals will be used to refer to the same parts as in FIG. 5.

Referring to FIG. 8, a receiving container 200 includes a bottom plate 210 and a plurality of sidewalls 220. The sidewalls 220 are formed on the edge portions of the bottom plate 210 to form a receiving space on the bottom plate 210. A light-mixing member 230 is disposed on the sidewalls 220, and the light-mixing member 230 is positioned on top of the sidewall 220 spaced apart from a light providing device 100 by a fixed distance. The light providing device 100 is disposed on the bottom plate 210.

The light mixing member 230 decreases the volume of the receiving space needed for mixing red, green and blue lights that are generated from the light providing device 100; thus, the entire volume and weight of the backlight assembly is reduced.

Display Apparatus

Figure 9:
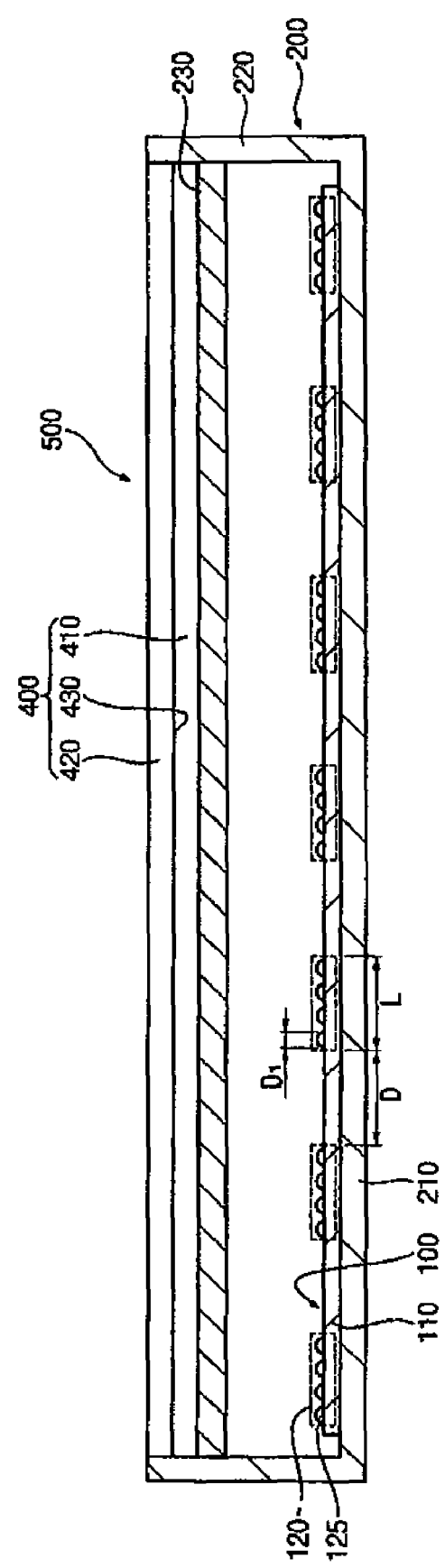
FIG. 9 is a cross sectional view illustrating a display apparatus in accordance with an exemplary embodiment of the present invention.

FIG. 9 is a cross sectional view illustrating a display apparatus in accordance with one embodiment of the present invention.

Referring to FIG. 9, a display apparatus 500 includes a display panel 400 and a backlight assembly 300.

The backlight assembly 300 includes a light providing device 100, a receiving container 200 and a light-mixing member 230.

The light-providing device 100 has a driving substrate 110 and a light source array 120.

The driving substrate 110 has a rectangular plate shape having a first side and a second side. A first length of the first side is longer than a second length of the second side. The driving substrate 110 may include a metal having a high heat conductive material. In some embodiments, the driving substrate 110 includes a power-supply line (not shown) for transferring the power supplied from an external power supplying unit to the driving substrate 110. At least one light source array 120 is disposed on the driving substrate 110. The light source array 120 is positioned on the driving substrate 110 along a direction parallel to the first side. In an exemplary embodiment, the number of the light source arrays 120 is about 3, and three light source arrays 120 are disposed on the driving substrate 110 in a line.

Each of the light source arrays 120 has a length of L on the driving substrate 110, and the light source arrays 120 are spaced apart by an interval D. The interval D between the light source arrays 120 is substantially identical to the length of L.

Each of the light source arrays 120 includes at least one light emitting diode 125. The light emitting diodes 125 of the light source arrays 120 are separated by an interval $D_1$ that is shorter than the interval D of the light source arrays 120. The light source arrays 120 including light emitting diodes 125 are arranged in a line along a direction parallel to the first side of the driving substrate 110. The number of the light emitting diodes 125 of the light source arrays 120 is about 2 to about 4. The light emitting diodes 125 emit light when electrical power is supplied to the light emitting diodes 125 through the driving substrate 110.

Each of the light emitting diode 125 emits red light, green light or blue light and the light emitting diodes 125 are arranged in an alternating manner to form the light source array 120. The red, green, and blue lights generated from the light emitting diodes 125 are mixed over the driving substrate 110 to generate white light above the driving substrate 110.

The light source arrays are arranged on the driving substrate 110 spaced apart from each other at regular intervals so that the brightness and color reproducibility of the light generated from the light emitting diodes 125 are greatly improved.

A receiving container 200 may include a bottom plate 210, and the light-generating device 100 is disposed on the bottom plate 210. In the embodiment shown, the light generating devices 100 are aligned substantially parallel to each other on the bottom plate 210. The light source arrays 120 of the light generating devices 100 is disposed on the bottom plate 210 in a staggered configuration.

The light generating device 100 is disposed on the bottom plate 210 of the receiving container 200 and the light source arrays 120 are aligned substantially parallel to each other on the bottom plate 210. The light source arrays 120 are disposed on the bottom plate 210 in the staggered configuration.

Since the light generating devices 100 including the light source arrays 120 are alternately disposed on the bottom plate 210, the heat generated from the light emitting diodes 125 is rapidly dissipated from the light generating device 100. Hence, the brightness and color reproducibility of the light that is generated from each of the light emitting diodes 125 are improved.

The light mixing member 230 decreases a volume of the receiving space needed for mixing red, green and blue lights that are generated from the light providing device 100; thus, the entire volume and weight of the backlight assembly 300 is reduced.

The display panel 400 includes a thin film transistor substrate 410, a color filter substrate 420 and a liquid crystal layer 430. The liquid crystal layer 430 is interposed between the thin film transistor substrate 410 and the color filter substrate 420. The display panel 400 varies the arrangement of liquid crystal molecules in the liquid crystal layer 430 through the differential voltage between the thin film transistor substrate 410 and the color filter substrate 420, so that the transmittance of the light that passes through the liquid crystal layer 430 is changed. Thus, the display panel 400 displays an image based on the light passing through the liquid crystal layer 430.

As described above, the light generating device rapidly dissipates the heat that is generated from the light emitting diodes, so that the brightness of the light generated from the light emitting diodes is greatly increased. The quality of the image of the display apparatus is improved by the light-generating device.

Having thus described exemplary embodiments of the present invention it is to be understood that the invention defined by the appended claims is not to be limited by particular details set forth in the above description as many apparent variations thereof are possible without departing from the spirit or scope thereof as hereinafter claimed.

What is claimed is:

1. A light generating device comprising:
a first driving substrate;
a plurality of first light source arrays disposed in a line on the first driving substrate;
a second driving substrate neighboring the first driving substrate; and
a plurality of second light source arrays disposed in a line on the second driving substrate, wherein the first and second light source arrays are arranged in a staggered configuration.

2. The light generating device of claim 1, wherein the second driving substrate is spaced apart from the first driving substrate.

3. The light generating device of claim 2, wherein a width of each of the first and second driving substrates is substantially equal to an interval between the first driving substrate and the second driving substrate.

4. The light generating device of claim 1, wherein each of the first driving substrate has a rectangular planar shape with two first sides and two second sides, wherein the first sides have a first length and the second sides have a second length that is shorter than the first length of the first sides.

5. The light generating device of claim 1, wherein each of the first and second light source arrays comprises a plurality of light emitting diodes arranged in a first direction spaced apart from each other, each of the light emitting diodes generating light when electric power is applied thereto through the first and second driving substrates, respectively.

6. The light generating device of claim 5, wherein the number of the light emitting diodes of the first light source array is two, and the number of the light emitting diodes of the second light source array is two.

7. The light generating device of claim 5, wherein the light emitting diodes of the first light source array comprises two different-colored light emitting diodes, and the light emitting diodes of the second light source array comprises two different-colored light emitting diodes.

8. The light generating device of claim 5, wherein the light emitting diodes disposed on the first driving substrate are spaced apart from each other by a first distance extending in a direction parallel to first sides of the first driving substrate.

9. The light generating device of claim 8, wherein the light emitting diodes disposed on the second driving substrate are spaced apart from each other by a second distance extending in a direction parallel to first sides of the second driving substrate, wherein the second distance and the first distance are substantially equal to each other.

10. The light generating device of claim 5, wherein the light emitting diodes of the first light source array are spaced apart by an interval that is shorter than an interval of the first light source array.

11. The light generating device of claim 5, wherein the light emitting diodes of the second light source array are spaced apart by an interval that is shorter than an interval of the second light source array.

12. The light generating device of claim 1, wherein a distance between neighboring first light source arrays is substantially equal to a length of each of the first light source arrays, and a distance between neighboring second light source arrays is substantially equal to a length of each of the second light source arrays.

13. A backlight assembly comprising:
a light generating device comprising:
a first driving substrate;
a plurality of first light source arrays disposed in a line on the first driving substrate;
a second driving substrate neighboring the first driving substrate; and
a plurality of second light source arrays disposed in a line on the second driving substrate, wherein the first and second light source arrays are arranged in a staggered configuration;
a receiving container having a bottom plate and sidewalls formed at edge portions of the bottom plate, the driving substrate being disposed on the bottom plate.

14. The backlight assembly of claim 13, wherein each of the first and second light source arrays comprises a plurality of light emitting diodes arranged in a first direction spaced apart from each other, each of the light emitting diodes generating light when electric power is applied thereto through the first and second driving substrates, respectively.

15. The backlight assembly of claim 14, wherein the light emitting diodes of the first light source array comprises two different-colored light emitting diodes, and the light emitting diodes of the second light source array comprises two different-colored light emitting diodes.

16. The backlight assembly of claim 13, wherein the second driving substrate is spaced apart from the first driving substrate.

17. The backlight assembly of claim 13, wherein a width of each of the first and second driving substrates is substantially equal to an interval between the first driving substrate and the second driving substrate.

18. The backlight assembly of the claim 13, further comprising a light mixing member that is coupled to the sidewalls to mix the light generating from the light generating device.

19. A display apparatus comprising:
a light generating device generating light, the light generating device comprising:
a first driving substrate;
a plurality of first light source arrays disposed in a line on the first driving substrate;
a second driving substrate neighboring the first driving substrate; and
a plurality of second light source arrays disposed in a line on the second driving substrate, wherein the first and second light source arrays are arranged in a staggered configuration;
a receiving container having a bottom plate and sidewalls formed at edge portions of the bottom plate, the driving substrate being disposed on the bottom plate; and
a display panel displaying an image by using the light generated by the light generating device.

20. The display apparatus of claim 19, wherein a width of each of the first and second driving substrates is substantially equal to an interval between the first driving substrate and the second driving substrate.

* * * * *